United States Patent [19]
Nicholson

[11] 3,863,938
[45] Feb. 4, 1975

[54] SEALING MEANS

[75] Inventor: Terence Peter Nicholson, County Durham nr. Consett, England

[73] Assignee: The Corrugated Packing and Sheet Metal Company Limited, Newcastle upon Tyne, England

[22] Filed: Feb. 2, 1973

[21] Appl. No.: 329,137

[30] Foreign Application Priority Data
Sept. 27, 1971 Great Britain .................... 44907/71

[52] U.S. Cl. .............. 277/200, 277/235 A, 277/236
[51] Int. Cl. ............................................. F16j 15/08
[58] Field of Search ......... 277/235 A, 236, 180, 42, 277/206.1, 206 R, 213, 200

[56] References Cited
UNITED STATES PATENTS

| | | | |
|---|---|---|---|
| 1,366,879 | 1/1921 | Dennedy ........................... | 277/42 X |
| 3,428,340 | 2/1969 | Pelton ............................... | 277/213 X |
| 3,455,562 | 7/1969 | Burtis ............................... | 277/236 X |
| 3,595,588 | 7/1971 | Rode ................................. | 277/206 R |

*Primary Examiner*—Samuel B. Rothberg

[57] ABSTRACT

An annular seal for sealing between two flat surfaces, the cross-section through the seal being substantially like the Greek symbol 'Sigma', such a shape giving good sealing contact pressure in conjunction with great flexibility.

4 Claims, 4 Drawing Figures

SEALING MEANS

This invention relates to sealing means, and more particularly to such means for effecting a fluid-tight seal between two flat surfaces.

According to the invention, there is provided sealing means comprising a ring of resilient material which is substantially sigma-shaped in cross-section, having a pair of outer arms and a pair of intermediate members.

The free ends of the outer arms of the sigma may be inturned to rest on the adjacent intermediate member of the sigma, thereby to improve the sealing effect of the means.

The sealing surface of each outer arm may be coated with a layer of soft material such as silver, P.T.F.E. (polytetrafluorethylene), or alum (aluminium) foil or the like which can flow into any surface irregularities in the surfaces to be sealed.

By way of examples only, embodiments of the invention will now be described in greater detail with reference to the accompanying drawings of which:

Figure 1:
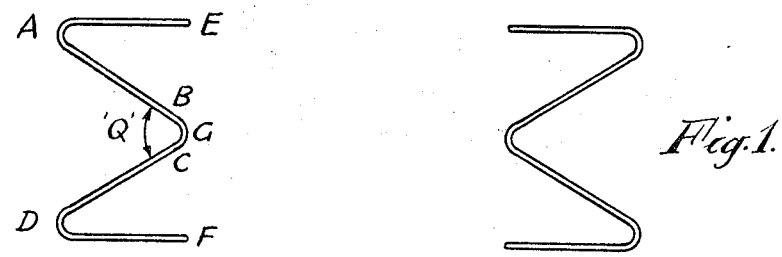
FIG. 1 is a section through a first sealing ring according to the invention.

FIG. 1 illustrates a standard seal according to the invention, the section through which substantially takes the form of the Greek symbol sigma. The seal has a low clamp load and must therefore be clamped under controlled compression to avoid overcompression and resultant destruction. The necessary control can be achieved either by placing the seal in a recess of predetermined depth (e.g., FIG. 3) or by a nip control ring or plate.

Referring to FIG. 1, the section comprises outer arms referenced AE and DF, intermediate portions referenced AB and CD, and a curved central part referenced G. The angle between the portions AB and CD is 'Q'.

When the ring is compressed the portions AB and CD are somewhat flattened, and the angle 'Q' is reduced. During compression of the ring, the points A and D want to move outwardly and the points B and C want to move inwardly.

However this change of diameter cannot take place, the points A and D being restrained by virtue of the presence of the arms AE and DF, and the points B and C being restrained by virtue of the hoop strength inherent in the part G.

The resultant restriction on the two intermediate portions of the ring AB and CD results in a very high rate of spring between flanges AE and DF. Consequently, because of this quality, the seal ring will return very closely to its original overall thickness after compression. This is referred to generally as the quality of recoverability which is essential in top grade seal rings.

These built in characteristics have the combined effect of producing good contact pressure of the arms AE, DF with the associated mating surfaces to be sealed, in conjunction with great flexibility of the seal ring as a whole which is essential when there is movement of the mating faces due to occurrences such as vibration, pulsation and the like.

In most applications it is preferred that the angle 'Q' is greater than 90°, thus enabling the pressurised medium to provide assistance in achieving the finest sealing qualities. However, the reverse may occur in certain circumstances, it therefore being necessary to study each particular application before determining the precise section of the ring. In heavy structural designs there are usually no problems in obtaining a perfect seal, as in these instances seal rings with a very strong and large cross-section can be used.

However in very light structures, or due to complexity, it may not be possible to obtain sufficient contact pressure of the mating faces on the seal. This can be overcome by providing on the sealing faces of the arms AE, DF a soft facing or coating of, for example, silver, P.T.F.E., alum foil or the like which can flow into any surface irregularities of the mating faces to obtain a leak tight seal. In some cases this facing or coating may also be necessary to protect the seal from attack from its environment.

Figure 2:
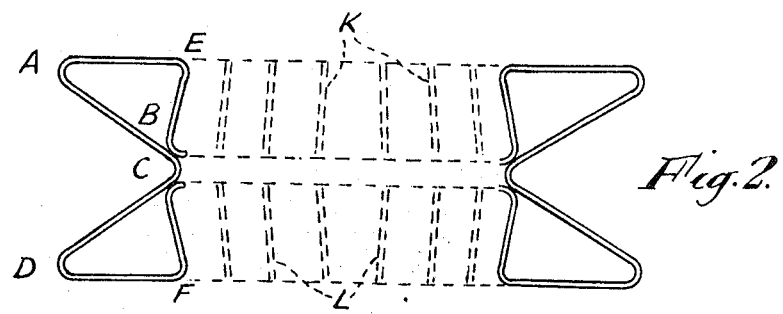
FIG. 2 is a section through a second sealing ring according to the invention.

In, for example, very high vacumm application where seals of the highest quality are needed, the more sophisticated design shown in FIG. 2 is recommended. In this design, the outer arms AE, DF are inturned to provide rims resting on the adjacent sloping intermediate portions AB, CD at BC respectively. These rims have the effect of jacking the sealing surfaces of the arms AE, DF to the mating surfaces at E, F respectively, in a similar manner as the portions AB, CD jack said surfaces at A and D. This affect can be further supplemented by having the arms AE, DF angled slightly outwardly from the horizontal as viewed in FIG. 2, thus making the dimension EF greater than AD.

Should it be found that the inturned rims EB and FC are too rigid, this rigidity can be reduced by cutting a series of axial slots K in said rims, these rims then each comprising a series of parallel fingers L.

Although the seals are illustrated as sealing pressure from the inside, they can have their sections reversed through 180° to seal pressure off equally well from the outside.

Figure 3:
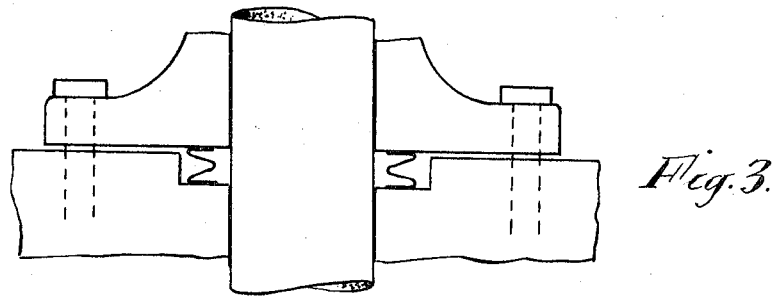
FIG. 3 illustrates a first application of the invention.
Figure 4:
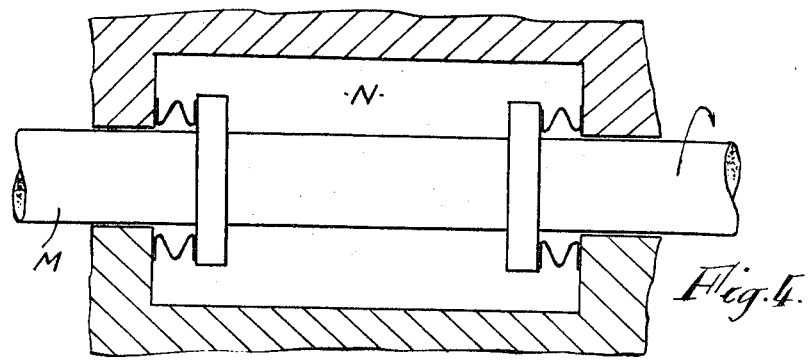
FIG. 4 illustrates a second application of the invention.

FIG. 3 illustrates a seal according to the invention in use as a static seal between mating faces, while FIG. 4 illustrates two such seals around a rotating shaft M, the volume N being pressurised.

The radii of curvature of the rings at points A, D and G should, wherever possible, be at least twice the thickness of the material — which may be, for example, high nickel alloy or spring carbon steel — to prevent cracking. In very fragile structures, it might prove necessary to convex the portions AB, CD towards the pressure zone in order to prevent these surfaces collapsing.

The seals can be used in multiples to provide a "back up" system.

What I claim and desire to protect by Letters Patent is:

1. Sealing means comprising a ring of resilient material which is substantially sigma-shaped in cross-section, having a pair of outer arms and a pair of intermediate arms, the free ends of the outer arms being inturned to define rim portions in turn having free ends resting on the adjacent intermediate members.

2. Sealing means as claimed in claim 1 the rim portions each comprising a plurality of parallel fingers defining between them a plurality of axial slots.

3. Sealing means according to claim 1 wherein said intermediate members at their juncture define in the unstressed state of the resilient ring an included angle which is substantially twice the included angle between the straight outer arms and the straight intermediate members.

4. Sealing means according to claim 1 wherein a coating of soft material is provided on the sealing face of each outer arm.

* * * * *